United States Patent [19]
Kuntz

[11] Patent Number: 5,396,866
[45] Date of Patent: Mar. 14, 1995

[54] RAM TUBE

[76] Inventor: Dennis R. Kuntz, Box 135, Frankford, Mo. 63441

[21] Appl. No.: 174,288

[22] Filed: Dec. 27, 1993

[51] Int. Cl.⁶ .......................................... F02M 31/00
[52] U.S. Cl. ................................ 123/25 B; 123/595
[58] Field of Search ............... 123/543, 545, 547, 557, 123/559.1, 559.2, 25 A, 25 B, 25 D, 538, 52 M; 165/52, 110

[56] References Cited

U.S. PATENT DOCUMENTS

| | | | |
|---|---|---|---|
| 1,298,835 | 4/1919 | Vaughan | 165/52 |
| 1,306,496 | 6/1919 | Mohrdieck | 123/545 |
| 2,082,666 | 6/1937 | Ulrich | 123/52 M |
| 3,762,385 | 10/1973 | Holknagel | 123/545 |
| 3,981,285 | 9/1976 | Schueler et al. | 123/119 |
| 4,188,928 | 2/1980 | Faustinos | 123/122 |
| 4,290,400 | 9/1981 | Pomerantz | 123/440 |
| 4,342,303 | 8/1982 | McCord | 123/557 |
| 4,388,910 | 6/1983 | Birdwell | 165/52 |
| 4,506,647 | 3/1985 | Geddes et al. | 123/557 |
| 4,596,288 | 6/1986 | Knoch | 165/901 |
| 4,611,567 | 9/1986 | Covey | 123/545 |
| 4,718,393 | 1/1988 | Bakish | 123/545 |
| 4,862,858 | 9/1989 | Goldsberry | 123/538 |
| 4,862,859 | 9/1989 | Yunick | 123/545 |
| 5,040,518 | 8/1991 | Hamm | 123/545 |
| 5,048,501 | 9/1991 | Smith et al. | 123/554 |
| 5,117,782 | 6/1992 | Bischoff | 123/1 A |
| 5,197,447 | 3/1993 | Dick | 123/557 |
| 5,205,264 | 4/1993 | Hoffman, Sr. | 123/555 |
| 5,218,944 | 6/1993 | Leonard | 123/557 |
| 5,219,399 | 6/1993 | Brana | 123/557 |

FOREIGN PATENT DOCUMENTS

0828061  5/1938  France .................. 123/545

Primary Examiner—Andrew M. Dolinar
Assistant Examiner—M. Macy
Attorney, Agent, or Firm—Richard J. Grundstrom

[57] ABSTRACT

The ram tube of this invention basically consists of an intake bracket, inner tube, output bracket, outer tube, input port and output port. The intake and output brackets are attached to the ends of the inner tube for attaching the ram tube to the base of a carburetor and the intake to an intake manifold of an internal combustion engine. The outer tube is installed over and surrounds the inner tube to create a passage between the inner and outer tubes. Exhaust is directed from the exhaust manifold of the engine to an input port on the outer tube. The exhaust passes through the passage and exits through the output port. The exhaust heats the inner tube to in turn heat the air/fuel mixture passing through the inner tube. The fuel is completely vaporized and placed in a dry vapor condition as it passes through the heated inner tube. The fuel entering the combustion chamber in a dry vapor condition burns more completely, at a higher temperature and at a faster rate to provide a higher efficiency engine. Due to the high temperature achieved using the ram tube, water can be injected into the ram tube or air stream for use as a fuel supplement. The ram tube of this invention can also be used in conjunction with a heat exchanger for initial vaporization of fuel in cooler weather and/or a turbo charger, or other type of device which increases volume efficiency, for pressurizing the air/fuel mixture for additional engine performance.

18 Claims, 6 Drawing Sheets

RAM TUBE

BACKGROUND OF THE INVENTION

The present invention relates to a ram tube and more particularly to a device which fits between the carburetor and intake manifold of an internal combustion engine to improve the engine efficiency.

The internal combustion engine has been used for several decades and will continue to be used in the foreseeable future. It is also well known that the internal combustion engine does not operate in the most efficient manner. There are several reasons for the inefficiencies. The reasons can include the nature of the fuel. The fuel used is not pure, in that there are several components of the fuel all of which may have a different vapor point and point of combustion. The engine itself must operate from about 350 to about 7,500 revolutions per minute under all sorts of various loads. In order to do so, the engine is designed to operate and start under a wide variety of conditions.

There have been numerous improvements over the years to improve the efficiency of the internal combustion engine. Improvements to the engine have been made in stroke and bore or displacement, combustion chamber design, ignition systems and fuel system. The basic operation of the engine despite the improvements still remains the same. This invention relates to an improvement in the fuel system. It is the belief of many that the greatest boost in efficiency of the internal combustion engine can be made by improvements in the fuel system and increasing the percentage of fuel being burned within the combustion chamber.

In a typical engine only a percentage of the fuel entering the combustion chamber is actually burned. The unburned portion is released to the atmosphere through the exhaust system. The catalytic converters now used on most engines burn off an additional percentage of the unburned gases. This unburned portion contains energy which is wasted. The efficiency of the engine is greatly improved as a greater percentage of the fuel is burned in the combustion chamber. An additional benefit of a more complete burn is a reduction in the pollutants exiting the exhaust system, which benefits us all.

The internal combustion engine also dissipates a large quantity of heat through the coolant system and as heated gases out the exhaust. The temperature of the combustion chamber rises as the fuel is burned. The increase in temperature and explosive nature of the fuel, causes the expansion of the gases in the closed combustion chamber. The resulting forces on the piston turn the crankshaft. Due to the nature of the fuel, design of the engine, temperature, and other factors the rate of "burn" of the fuel is over a period of time. Typically, the burn begins during the compression stroke of the four cycle engine. The fuel is ignited a few degrees before top dead center. The maximum force exerted by the burn occurs several degrees after top dead center.

The fuel entering the combustion chamber in the typical engine is partially vaporized and partially liquid droplets suspended in the air/fuel mixture. To have a complete burn of the fuel, the fuel must be in a vaporized state. Part of the delay of the burn is caused by vaporization of the liquid droplets by the increase in temperature by burning the vaporized fuel. This rate of burn also causes a long duration of heat buildup. This heat is dissipated to the cylinder walls and head where, in most instances, a coolant system captures the excess heat and transfers the heat to a radiator for dissipation to the ambient air. Additional heat is carried away through exhaust gases.

There are a couple different theories and controversies on how to overcome this problem. This is evident by looking over the prior art. There are turbo chargers that increase the pressure of the air/fuel mixture in the intake manifold. This allows for an increase in the quantity of air/fuel mixture entering the combustion chamber when the intake valve opens. There are devices which cool the air/fuel mixture prior to the intake manifold, the theory being a denser fuel entering the combustion chamber contains more burnable fuel. Another theory to overcome this problem, and of which this invention pertains, is to vaporize the fuel before combustion. There are several different devices and means in the prior art which address vaporizing the fuel prior to combustion.

In the prior art there are a wide variety of heat exchangers that use heated exhaust, heated coolant and/or electric heaters to heat the fuel or air/fuel mixture. Some prior art heats the raw fuel in the gas line before introduction to the carburetor. The fuel is heated within heat exchangers mounted on the exhaust manifold, or the gas line is wrapped around the exhaust manifold. Another uses an electric heat exchanger to electrically heat the fuel in the fuel line. Yet another uses the engines coolant to heat the fuel in a heat exchanger.

The prior art, which pertains to the present invention, heats the air/fuel mixture after the carburetor. Heating the air/fuel mixture after the carburetor has several advantages over heating the raw fuel. Fuel begins to vaporize at about 120 degrees. The carburetor is designed to mix a liquid fuel with air to provide the proper air to fuel ratio for combustion. If raw fuel were vaporized prior to the carburetor, the carburetor would not function properly, at least not without modification. Therefore, the heat has to be controlled within tolerances to maintain the liquid fuel when heating raw fuel prior to the carburetor. Heating the air/fuel mixture after the carburetor eliminates that problem.

Heating the raw fuel prior to the carburetor also creates a hazardous explosive condition. A large volume of raw fuel is heated or vaporized. The large volume of heated or vaporized fuel is in a condition to create a large explosion. Whereas, heating the air/fuel mixture after the carburetor heats or vaporizes approximately 5 cc of fuel, which drastically reduces the potential of the explosive hazard.

Several different heat exchangers using coolant, exhaust and/or electric heaters to heat the air/fuel mixture after the carburetor are also known in the art. The heat exchangers are used to completely vaporize the fuel prior to combustion. One system uses a complicated combination of a first heat exchanger using the engine coolant to vaporize the air/fuel mixture, a type of turbo charger to homogenize and compress the air/fuel mixture and a second heat exchanger using exhaust to super heat the air/fuel mixture prior to the intake valves. It is an integrated system that would not function properly if any of the components were not operating as designed.

The most simple of the heat exchangers in this category are simple devices fitting between the carburetor and the intake manifold. Most of these heat exchanges have a primary pathway through which the air fuel mixture must pass. A secondary system typically has a plurality of tubes extending across the air/fuel pathway in the primary pathway. The tubes of the secondary system are heated with exhaust, engine coolant or by an electrically heated coolant. The air/fuel mixture is vaporized as the mixture passes the heated tubes. The primary pathway of the air/fuel mixture is obstructed by the tubes in this type of system which restricts the flow. Additionally, portions of the air/fuel mixture may bypass the tubes and may not be heated.

An additional problem encountered with some prior art is vapor lock. As indicated, fuel begins to vaporize at approximately 120° F. If the carburetor is heated above this temperature, fuel within the carburetor may vaporize prematurely. Vapor within the carburetor inhibits proper operation of the carburetor. Some of the prior art did not overcome this problem.

Accordingly, it is an object of the present invention to provide a ram tube incorporated between the carburetor and intake manifold of an internal combustion engine.

Another object of the present invention is to provide a ram tube that heats the air/fuel mixture to completely vaporize all fuel present using heat from the exhaust which would normally be wasted.

A further object of the present invention is to provide a ram tube adapted for use on existing or new internal combustion engines.

Still another object of the present invention is to provide a ram tube of a predetermined length having an unobstructed pathway for the heating, expanding and accelerating the air/fuel mixture which allows the air/fuel mixture to gain thermal and inertial energy enroute to the intake manifold.

Still a further object of the present invention is to provide a ram tube that can also be used with other known devices that improve engine performance. The ram tube of this invention can be used along with preheaters or heat exchangers and turbo chargers which are readily available, as well as other devices which increase volume efficiency, such as super chargers and blowers.

Another object of the present invention is to provide a ram tube which provides sufficient heat for the utilization of water as a fuel supplement. To effectively utilize water as a fuel supplement, the water molecules must be heated to a temperature to ensure complete vaporization of the water. As the molecule is further heated it is broken down into a hydrogen-oxygen state so it can be burned in the combustion chamber to further enhance the engine efficiency. The ram tube of this design provides such a condition.

These and other objects and features of the present invention will be better understood and appreciated from the following detailed description of the main embodiment thereof, selected for purposes of illustration and shown in the accompanying drawings.

SUMMARY OF THE INVENTION

To accomplish the foregoing and other objects of this invention there is provided a ram tube and more particularly a device between a carburetor and intake manifold to vaporize and dry fuel prior to combustion.

The ram tube of this invention basically consists of an intake bracket, inner tube, output bracket, outer tube, input port and output port. The intake bracket is attached to the inner tube for attachment of the inner tube to the base of a carburetor. The output bracket attaches to the opposite end of the inner tube for attachment to an input manifold of an internal combustion engine. In this manner a direct path through the inner tube is provided from the carburetor to the intake manifold. The outer tube surrounds the inner tube to define a passage or space between the inner and outer tubes. The ends of the outer tube are closed. An input port on the outer tube provides an input for exhaust into the defined passage or space. The input port is attached to the exhaust of the internal combustion engine to provide heat. An output port on the outer tube allows the exhaust to escape the defined passage or space to an exhaust system.

The heated exhaust entering the input port passes through the defined passage or space and exits the output port. As the exhaust passes through the defined passage the inner tube is heated to an elevated temperature. The temperature of the air/fuel mixture passing through the inner tube is heated. Any liquid droplets of fuel are vaporized enroute. Due to the high temperatures within the inner tube a dry vapor state is achieved. The combustion rate and completeness of fuel burn is greatly enhanced, improving engine efficiency and reduced pollutants.

The basic ram tube as described above can also be used with a preheater or heat exchanger utilizing engine coolant to initially vaporize fuel. The heat exchange would be installed between the basic ram tube and the carburetor.

Additional performance could also be obtained by the incorporation of a turbo charger, or other devises such as a blower or super charger which increase volume efficiency, to pressurize the air/fuel mixture. The turbo charger, or other such device, would be incorporated after the carburetor and after the heat exchanger, if one is used.

The basic ram tube achieves a high temperature to vaporize any liquid fuel droplets, but the temperature is also sufficiently high to vaporize any water droplets as well. Since temperatures necessary to vaporize water are exceeded, the ram tube of this invention can utilize water injection as a fuel supplement to further increase engine efficiency.

DETAILED DESCRIPTION

Referring now to the drawings in general there is shown the preferred embodiments for the ram tube 10 of this invention.

Figure 2:
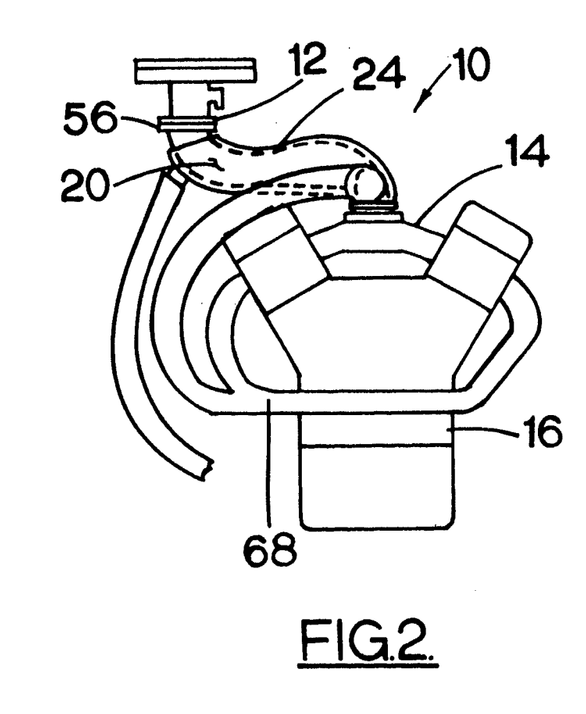
FIG. 2 is a forward view representing an engine having a ram tube with curves in a typical application.
Figure 3:
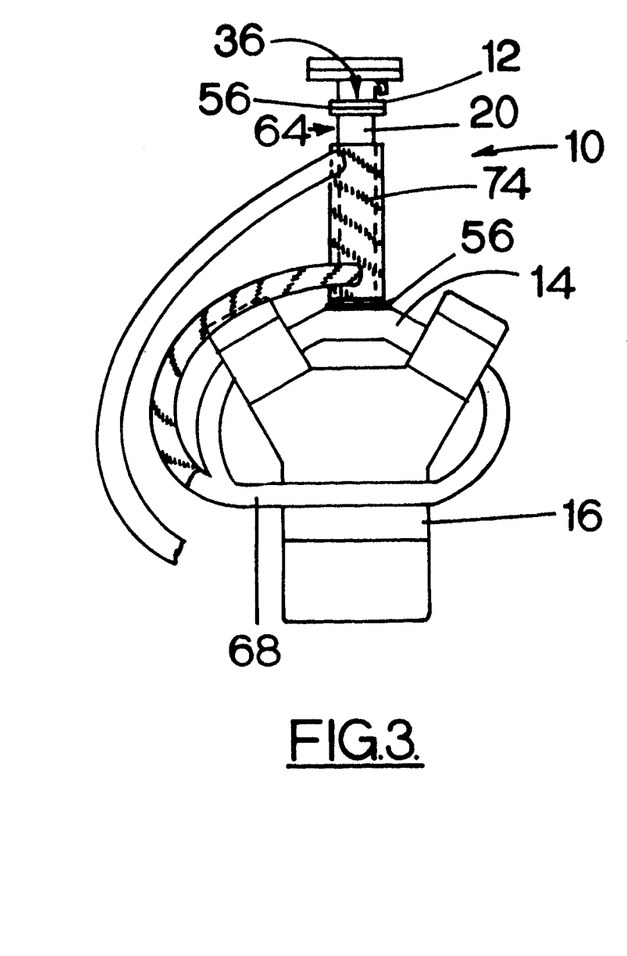
FIG. 3 is a forward view representing an engine having a straight ram tube in a typical application with the ram tube and exhaust being wrapped with insulation.

The ram tube 10 of this invention typically installs between the base of a carburetor 12 and intake manifold 14 on an internal combustion engine 16. Generally and in the most basic of the embodiments herein described, the ram tube 10 consists of an intake bracket 18, inner tube 20, output bracket 22, outer tube 24, input port 26 and exhaust port 28. Illustrated in FIG. 1. The ram tube 10 attaches to the base of the carburetor 12 via the intake bracket 18. The air/fuel mixture output from the carburetor 12 provides the input to the ram tube 10. FIGS. 2 and 3.

The air/fuel mixture travels the length of the inner tube 20 into the intake manifold 14. FIGS. 2 and 3. It should be noted that the output bracket 22 could also function as the intake manifold 14 in another embodiment, not shown. The inner tube 20 is contained within the outer tube 24. A passage or space 30 is defined between the inner tube 20 and the outer tube 24. Exhaust from the internal combustion engine 16 is directed into the input port 26. As the exhaust passes through the space 30, the inner tube 20 is heated by the exhaust. The exhaust exits the space 30 through the output port 28 to an exhaust system typically contained on a vehicle.

As the air/fuel mixture passes through the inner tube 20 the air/fuel mixture is heated. The inner tube, heated with exhaust, may reach a temperature of approximately 600° F. near the output bracket where the exhaust enters the space 30. The average inner tube 20 temperature is approximately 400° F. The heat within the inner tube 20 causes any fuel droplets in a liquid form to vaporize. Any moisture passing through the inner tube is also vaporized. The heat within the inner tube 20 creates a "dry vapor" state. It is believed that the dry vapor state at this temperature separates the fuel into its primary components, carbon, oxygen and hydrogen.

The air/fuel mixture passing through the ram tube 10 enters the combustion chamber in a dry vapor state. Energy in the form of heat has been added to the air/fuel mixture to create the dry vapor state. The rate of fuel burn and the completeness of fuel burn is highly enhanced by utilizing fuels in a dry vapor state. More calories contained within the fuel are actually available for use. This increased efficiency of the completeness of fuel burn dramatically reduces the exhaust gas emissions and wasted heat energy typically carried out the exhaust pipe. Greater than 97% of all volatile gases are burned in the cylinder.

The air/fuel mixture passing through the length of the ram tube 10 gains inertia energy. The mixture is further acted upon by the expansion of the air/fuel mixture as it is heated to provide additional inertia. Thus, when an intake valve is opened, the air/fuel mixture rams past the valve to completely fill the combustion chamber. The specific configuration, such as length, diameter and whether any bends are required, of the inner tube 20 is determined by engine and application specifics, including size of the engine 16, operation temperature, exhaust temperature, type of carburetor and physical location and layout.

The inner tube 20 in the preferred embodiment is a single hollow tube having a plurality of fins 32 on the inside surface. The fins 32 run parallel to the length of the inner tube 20. The fins 32 increase the surface area within the inner tube 20. The fins 32 also create a turbulence which causes fuel droplets to careen into the side walls or other surface where it is immediately dissipated as a dry vapor. Increased area and turbulence within the inner tube 20 allow a more efficient heat transfer and probability that all fuel and moisture is vaporized.

Figure 6:
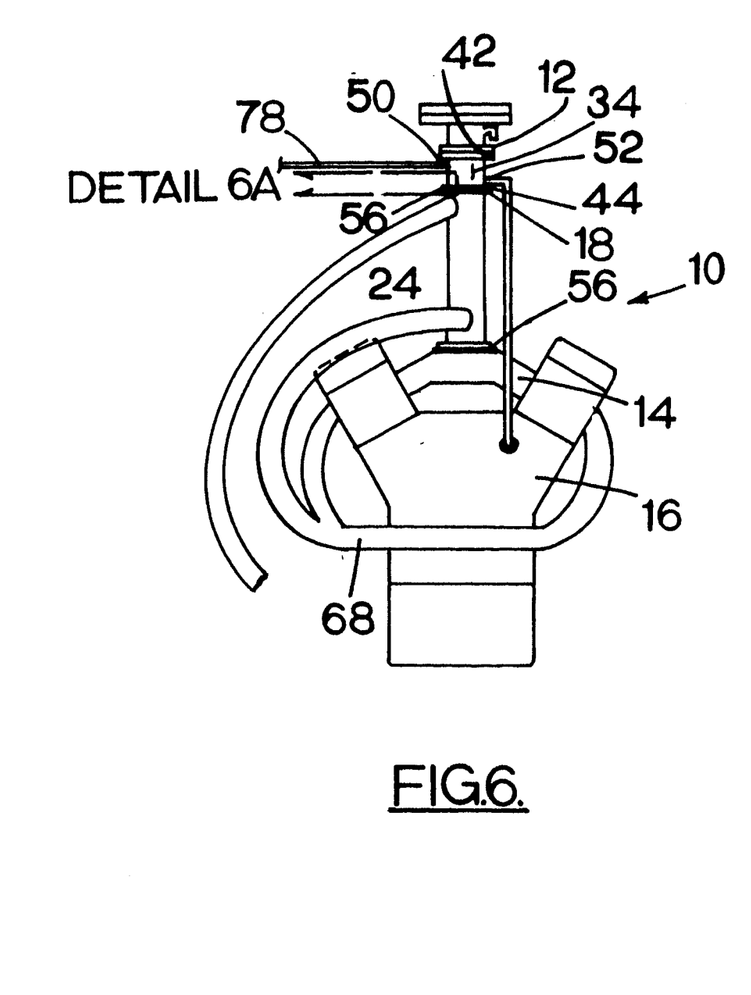
FIG. 6 is a forward view representing an engine having a straight ram tube used in conjunction with the heat exchanger.

The basic ram tube 10, as described above, functions without additional components. In tests on an actual vehicle, the ram tube 10 as described above produced nearly a 100% increase in efficiency. The ram tube 10 of this invention could also be used with a heat exchanger 34 or preheater located between the carburetor 12 and the intake 36 to the ram tube. FIG. 6. The heat exchanger 34 would provide heat to the air/fuel mixture for initial vaporization of the fuel. The heat exchanger 34 would utilize engine coolant for heating a first tube 38 through which the air/fuel mixture would pass. Typically, fuel used in internal combustion engines begins vaporization at approximately 120° F. Engine coolant temperature are in the neighborhood of 165° to 210° F. The heat exchange 34 maximum temperature will initially vaporize the majority of the fuel. However, a "dry vapor" state is not achieved. Specific embodiments and incorporation of the heat exchanger 34 are later described.

Figure 7:
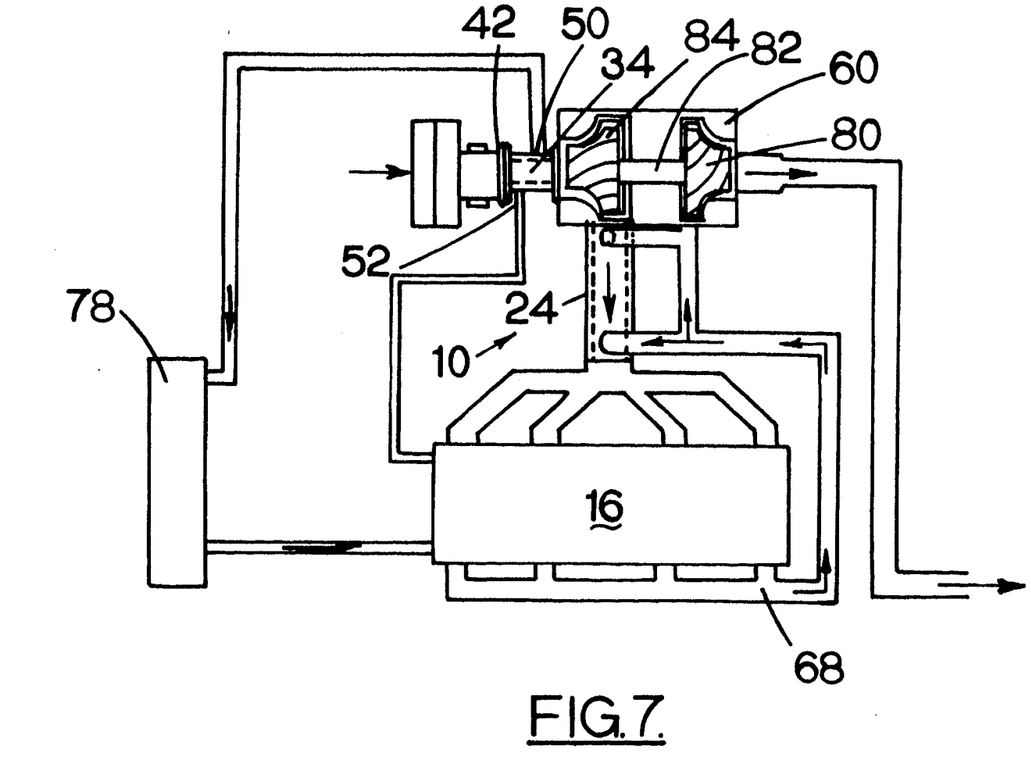
FIG. 7 is a schematical representation of a ram tube being used in conjunction with a turbo charger and a heat exchanger.

Additional high performance could also be obtained utilizing a turbo charger 60. FIG. 7. A turbo charger 60 is illustrated but any device which increases volume efficiency, such as super chargers or blowers, could also be utilized in place of the turbo charger 60. The turbo charger 60 compresses the air/fuel mixture between the turbo charger 60 and the intake valve of engine 16. The increase in pressure forces a greater quantity of the mixture into the combustion chamber when the intake valve opens. The increase in quantity of air/fuel mixture increases the fuel available for burn in each stroke.

One embodiment also includes a heat exchanger 34 and a turbo charger 60. Schematically illustrated in FIG. 7. The heat exchanger 34 provides an initial vaporization of the fuel in the air/fuel mixture as described above. The turbo charger 60 provides compression of the air/fuel mixture, also as described above.

Utilization of the ram tube 10 also provides a means of entering the hydrogen cycle to burn hydrogen and oxygen. Water in the hydrogen cycle may be used as a fuel supplement to further increase the efficiency of the internal combustion engine. Once the ram tube 10 is heated to a stable operating temperature (approximately 400° F. within the inner tube 20) water may be injected into the system. Water may be injected into the inner tube 20 via an injector 70. The injector 70 would be attached to the inner tube 20 such that water droplets would be injected into the air/fuel mixture pathway. The water droplets are vaporized as they are heated beyond the vapor point and careen off the fins 32 and other surfaces.

In another embodiment not shown, the temperature within the inner tube 20 may be as low as 220° F. based upon the type of fuel system used.

The water, in the alternative, may also be injected into the air stream at a point prior to the carburetor 12 if desired.

Within the combustion chamber, as the temperature nears 1,800°–2,600° F., the hydrogen begins to burn. This is the point where consumption of traditional fuel drops off and the integration of the hydrogen burn is valuable. The explosive energy of the hydrogen provides an incremental boost to the energy output of the engine. The typical temperature of the "burn" without the ram tube 10 is around 1,300° F. Using the ram tube 10 creates a condition in which the rate of burn is an almost instantaneous explosion of all fuel. This creates a combustion temperature of 1,800°-2,600° F. Water molecules are broken down into hydrogen and oxygen atoms and burned within a very short duration.

The preferred embodiment and the best mode contemplated of the ram tube of the present invention are herein described. However, it should be understood that the best mode for carrying out the invention hereinafter described is offered by way of illustration and not by the way of limitation. It is intended that the scope of the invention include all modifications which incorporate its principal design features.

Figure 1:
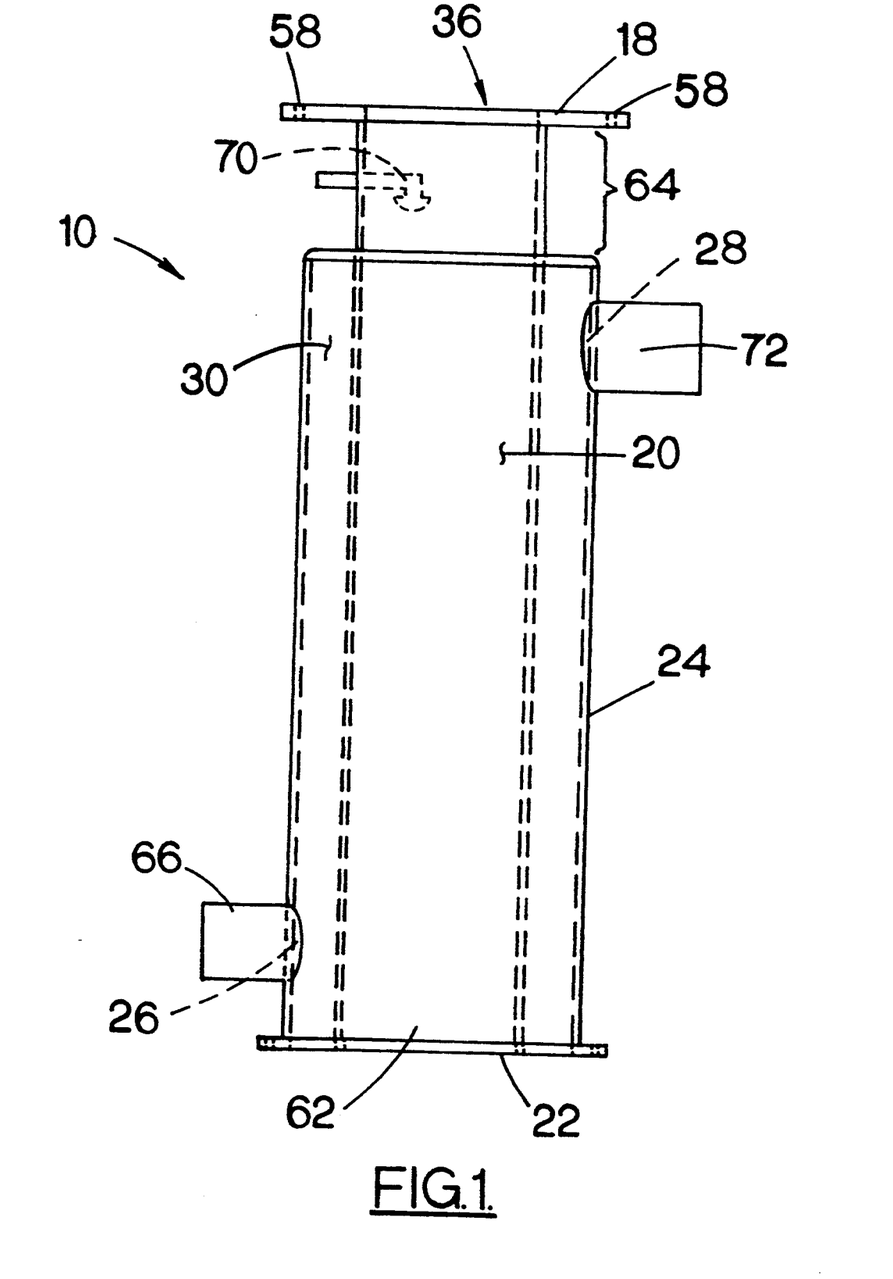
FIG. 1 is a side view illustrating the basic ram tube of this invention.

Referring to FIG. 1. The intake bracket 18 is generally a metal bracket resembling the base of the carburetor 12. It contains a center opening 36 corresponding to the opening on the base of the carburetor 12. It attaches to the base of the carburetor 12 typically by bolts. Typically, four bolts are used to attach the intake bracket 18 to the carburetor base. The intake base has bores 58 corresponding to the bolt pattern of the base of the carburetor 12. However, the specific configuration would be dependant on the carburetor used. A gasket 56 would be used to seal the base of the carburetor 12 to the intake bracket 18.

The inner tube 20 is typically made of stainless steel tubing or piping. It is attached to the intake bracket 18 for attachment to a carburetor 12. Typically it would be attached by welding. The opening 36 of the tube is aligned with the opening of the intake bracket 18. The diameter of the inner tube 20 is specific to the application. In some embodiments, the inner tube 20 may actually be a plurality of parallel tubes. FIGS. 8, 8a-8h, illustrates the various configurations of inner tube 20. The diameter may be as small as ⅜ of an inch for very small engines and may be as large as 5 inches for a large engine.

Figure 8A:
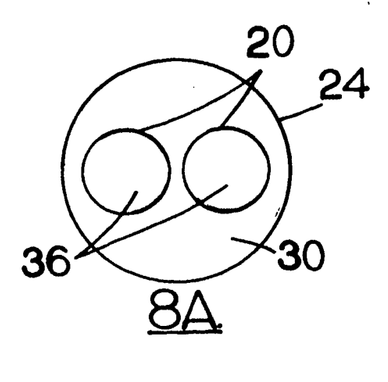
FIGS. 8a through 8h, illustrate the various configurations of the inner and outer tubes for the ram tube.
Figure 8B:
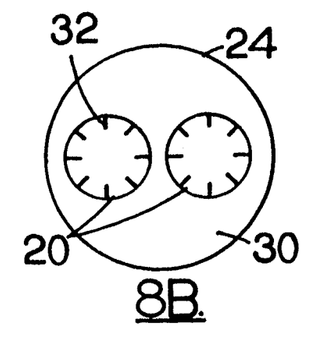
Figure 8C:
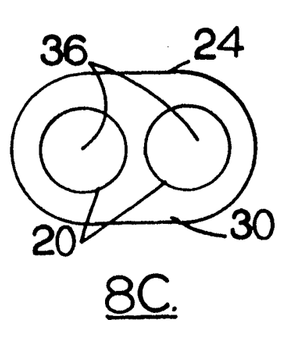
Figure 8D:
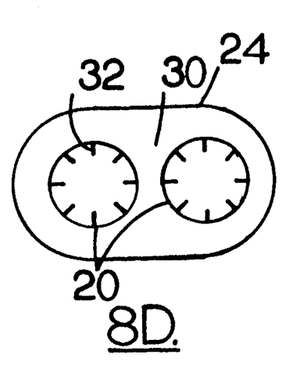
Figure 8E:
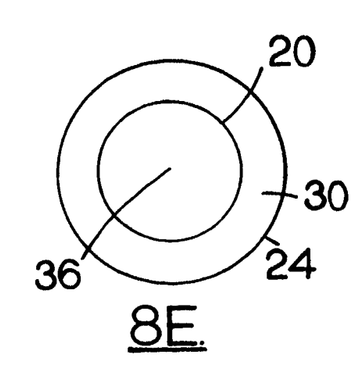
Figure 8F:
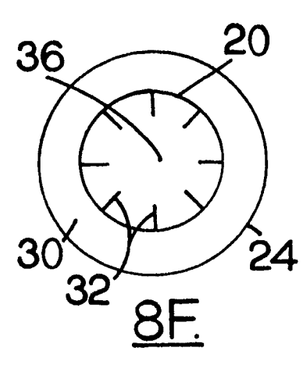
Figure 8G:
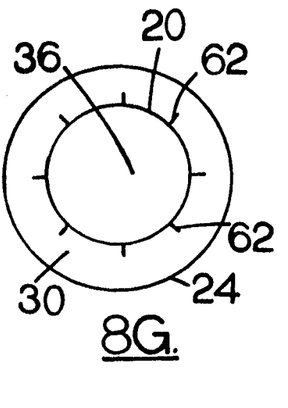
Figure 8H:
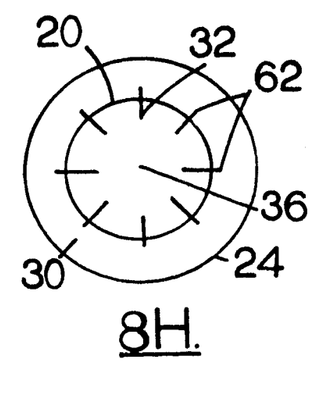

Fins 32 may also be included within the inner tube 20. FIG. 8. The fins 32 as stated above provides a greater surface area and creates a turbulence for increasing the likelihood of a molecule of fuel or water to careen into a surface and increase the efficiency of heat transfer. Generally, the fins 32 would extend inward and be parallel to the length of the inner tube 20. Exterior fins 62 extending outward from the inner tube 20 into the space 30 may also be included to increase heat transfer from the exhaust to the inner tube. FIGS. 8g and 8h.

Generally, a straight inner tube 20 is desired. FIGS. 1 and 3. However, the ram tube's inner and outer tubes 20 and 24 may have gentle flowing, large radius curves to facilitate fitting the ram tube 10 for specific applications without a large loss in efficiency. See FIG. 2. In some applications, not shown, it is anticipated that the ram tube 10 would have a continuous expanding curve radius creating a ram tube 10 in the shape of a spiral.

The length of the inner tube 20 is determined by the specific application and the accessories which are used in conjunction with the ram tube. These accessories typically include the turbo charger 60 and heat exchanger 34 described above. If a turbo charger 60, or other device to increase volume efficiency, is used the length is typically shortened.

The output bracket 22 is also similar to a base of a carburetor 12. The output bracket 22 has a center opening 62 corresponding to the opening on the opposite end of the inner tube 20. It is attached to the end opposite of the intake bracket 18 on the inner tube 20. As the intake bracket 18, it is typically welded to the inner tube 20. The output bracket 22 attaches to the intake manifold 14 on the engine. A gasket 56 is installed between the output bracket 22 and the intake manifold 14 to ensure a complete seal. Therefore, it would have a bolt pattern matching the pattern on the intake manifold 14. Once attached to the intake manifold 14, there is a complete path from the carburetor to the intake on the intake manifold 14.

The output bracket 22, in another embodiment not shown, could actually function as the intake manifold. In this situation the output bracket 22 would split at the end to form a channel for each intake located on the engine's head. The bolt pattern would then resemble the bolt pattern of the input ports on the head or the outake of the intake manifold 14. It would attach directly to the head.

The outer tube 24 is also made of a stainless steel tubing or piping. The diameter of the outer tube 24 is sized according to the size of the inner tube 20. The diameter has to be larger than the inner tube 20 to define a passage or space 30 between the outer surface of the inner tube 20 and the inner surface of the outer tube 24. The width of the space 30 is dependant on the particular application.

Exhaust from the engine 16 is directed through the space 30 between the inner 20 and outer 24 tubes. The outer tube 24 is installed over and surrounds the inner tube 20. One end is closed around the inner tube 20 near the output bracket 22. The opposite end is closed around the inner tube 20 near the intake bracket 16.

A length 64 of the inner tube 20 is left exposed between the intake bracket 18 and the point of closing the outer tube 24 to allow the inner tube 20 to cool at the intake. The purpose of this length 64 is to isolate the carburetor 12 from the heat of the exhaust. A couple of inches has been found sufficient. If the carburetor 12 were to overheat there could be a potential problem of vapor lock. The length 64 of inner tube 20 can be reduced, or not used at all if the ram tube 10 is used in conjunction with a heat exchanger 34 or turbo charger 60 or other device to increase volume efficiency. The accessories provided the necessary isolation to prevent the carburetor from overheating.

Exhaust from the engine 16 is directed to an input port 26 on the outer tube 24. The input port 26 is typically located near the output bracket 22 on the outer tube 24. It is typically a hole the size of an exhaust pipe cut into the outer tube 24. An extension 66 is welded into the intake port 26 for attaching a pipe from the exhaust manifold 68. The pipe from the exhaust manifold 68 could be welded to the extension 66, the pipe could fit over the extension 66 and be clamped tight or it could be attached by brackets, depending on the particular application.

An output port 28 is also located on the outer tube 24 at the end opposite the intake port 26. The intake and output ports 26 and 28 are located as far apart as possible. This allows the exhaust entering the input port 26 to travel the maximum length of the outer tube 24. Generally, it is as near the intake bracket 18 as possible. As the intake port 26, the output port 28 has an extension 72 welded to a hole the size of an exhaust pipe. An exhaust pipe connects to the extension 72 in a similar manner as the pipe attaches to the intake port extension 66. The other end attaches to the exhaust system of the vehicle on which the ram tube 10 is installed.

The exhaust enters the input port 26 and travels the length of the space 30 between the inner and outer tubes 20 and 24. It exits the output port 28. The exhaust heats the inner tube 20 as it passes through. The highest temperature of the inner tube 20 is near the output bracket 22. The temperature drops off as it nears the intake bracket 18. The heat absorbed by the inner tube 20, which is transferred to the air/fuel mixture traveling through the inner tube 20, significantly cools the exhaust prior to its exit through the output port 28.

The outer tube 28 may be wrapped with an insulation 74 to conserve heat transferred to the inner tube 20 and to prevent an excessive heat build up under the hood of the vehicle. Illustrated in FIG. 3. It is also likely that the exhaust manifold 68 in some application would be wrapped to conserve the exhaust heat to the inner tube 20. The temperature of the inner tube 20 must be maintained while the engine 16 is operating.

The ram tube 10 of this invention, allows the fuel to burn at a faster rate and more of the fuel is actually burned. The temperature of the combustion using the ram tube 10 is 1,800°-2,600° F. as compared to approximately 1,300° F. without the ram tube 10. The heat build up within the cylinder is over a very short duration as compared to a burn without the ram tube. This actually results in the engine 16 running cooler because of the shorter duration of the burn and the ability of the coolant system to remove the excess heat more quickly.

The temperature of the exhaust exiting the combustion chamber, past the exhaust valve, is approximately 100° F. higher than without the ram tube 10. However, the temperature of the exhaust leaving the tail pipe is drastically reduced, because a large portion of the heat was added to the fuel by the ram tube 10. The heat which is normally wasted is utilized to a higher capacity to increase engine efficiency and performance.

Figure 6A:
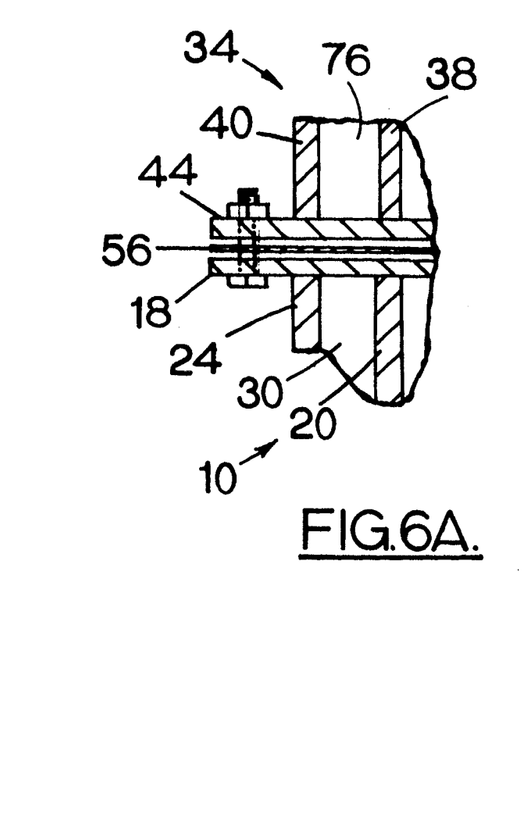
FIG. 6a is a sectional and exploded view of the junction of the ram tube and heat exchanger.

A heat exchanger 34 could also be used to initially vaporize the fuel prior to entering the intake of the ram tube 10. The primary purpose of the heat exchanger 34 would be to compensate for cold temperatures in colder weather. The heat exchanger 34 would attach between the base of the carburetor 12 and the intake bracket 18. FIGS. 6 and 6a.

Figure 4:
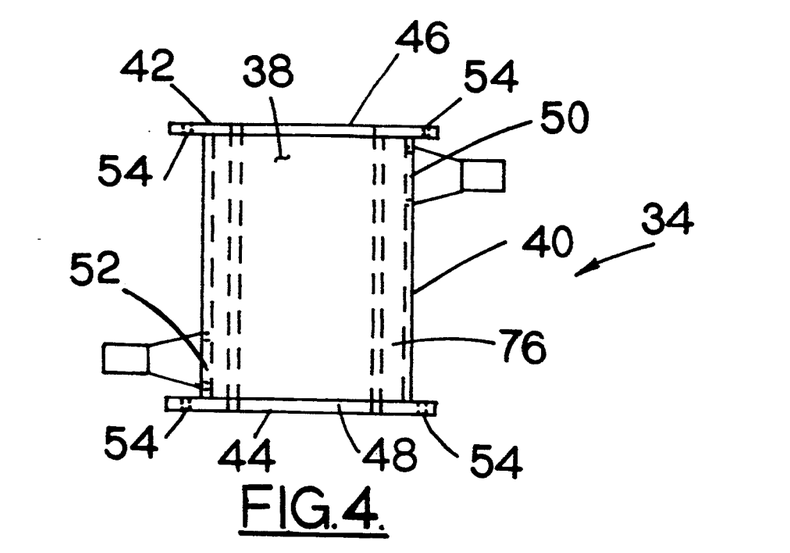
FIG. 4 is a side view of preferred embodiment of the heat exchanger.
Figure 5:
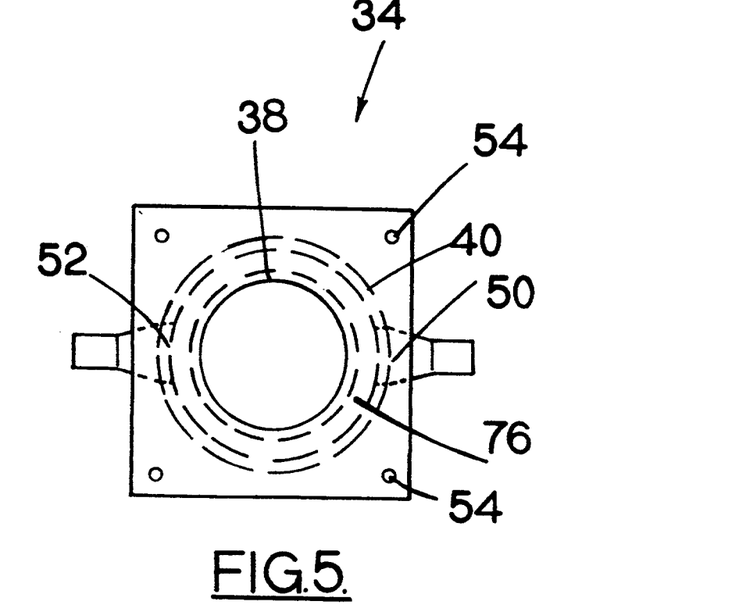
FIG. 5 is a top view of the preferred embodiment of the heat exchanger.

In the preferred embodiment, the heat exchanger 34 consists of a first bracket 42 which attaches to the base of the carburetor 12, similar to the intake bracket 18. The first bracket 42 would also have an opening 46 corresponding to an opening on the base of the carburetor 12. A first tube 38 similar to the inner tube 20 but of a much shorter length, attaches to the first bracket 42. The first tube 38 provides an unobstructed path for the air/fuel mixture passing through.

A second bracket 44 attaches to the first tube 38 on the opposite end of the first bracket 42. The second bracket 44 also resembles the intake bracket 18. The second bracket 44 on the heat exchanger 34 attaches the heat exchanger 34 to the intake bracket 18. A second tube 40 is installed over and surrounding the first tube 38. The ends of the second tube 40 are closed around the first tube 38 to completely seal the space 76 between the first and second tubes 38 and 40. The space 76 between the first and second tubes 38 and 40 define a passage or space 76 for heated engine coolant.

An input 52 on the second tube 40 into the space or passage 76 receives engine coolant. The engine coolant heats the first tube 38 contained within the second tube 40. An output 50 on the second tube 40 allows the coolant to exit the passage 76 and return to the engines coolant system 78. Typically, the input 52 and output 50 are nipples which receive heater hoses. In the preferred embodiment they are welded onto the second tube 40 and lead into the space 76 between the first and second tubes 38 and 40. The input 52 and output 50 are spaced as far as part as possible to allow for maximum heat transfer.

The heated coolant heats the first tube 38. The air/fuel mixture passing through the first tube 38 absorbs the heat to vaporize fuel droplets. The first tube 38 may reach a temperature in the neighborhood of 160° to 210° F. Normal fuel begins to vaporize at approximately 120° F. A majority of the fuel will vaporize as it passes through the first tube 38.

The first tube 38 may also contain fins similar to the inner tube 20 of the basic ram tub 10 as described above. The fins would increase the surface area for increased heat transfer to the air/fuel mixture.

A turbo charger 60, representing a typical device which increases volume efficiency, is also an accessory which can be utilized with the ram tube 10 for an increased performance. FIG. 7. The turbo charger 60 typically, includes a first turbine 80 which is in the exhaust path. The passing exhaust rotates the turbine 80. A shaft 82 connects the first exhaust drive turbine 80 to a second turbine 84. The second turbine 84 is in the air/fuel mixture path. The second turbine 84 compresses the air/fuel mixture between the second turbine 84 and the intake valves of the engine 16. This allows a greater quantity of air/fuel mixture to be forced into the combustion chamber when the valve opens. The turbo charger 60 is a standard turbo charger 60 which is readily available.

The ram tube 10, as discussed above allows the use of water as a fuel supplement. Water is injected into the path of the air/fuel mixture passing through the inner tube 20 via injector 70. Alternatively, not shown, the injector could be placed in the air stream prior to the carburetor. Either embodiment would work.

Typically, the water injection system would include a water reservoir, a pump, injector 70 and necessary conduits between the various components. The water would be pumped from the reservoir to the injector 70 to spray the water at a specific predetermined rate into either the air stream before the carburetor or the air/fuel mixture in the ram tube 10.

Without the high instantaneous temperature achieved using the ram tube 10, the use of the water injection system as a fuel supplement would be ineffective. The ram tube 10 by itself approximately doubles the engines output per gallon of fuel burned. The use of water and the hydrogen cycle almost doubles the output again. This results in a very efficient engine as compared to an existing engine without the ram tube.

The ram tube 10 of this invention can be used with any internal combustion engine in which the wasted heat can be captured. This could include, but not be limited to, automobile engines, airplanes, trucks, model engines, lawn mowers, boats, stationary engine, and farm equipment. It will be appreciated that for the various applications modifications to the ram tube 10 would have to be made in accordance with the particular application. These modifications are within the spirit and scope of the invention herein disclosed.

Having described the invention in detail, those skilled in the art will appreciate that modifications may be made of the invention without departing from the spirit of the inventive concept herein described.

Therefore, it is not intended that the scope of the invention be limited to the specific and preferred embodiments illustrated and described. Rather, it is intended that the scope of the invention be determined by the appended claims and their equivalents.

What is claimed is:

1. A ram tube for installation between the base of a carburetor and intake manifold on an internal combustion engine comprising:

an intake bracket, having a center opening corresponding to an opening on said base of said carburetor, said intake bracket being attachable to said base of said carburetor;

an inner tube comprises a plurality of parallel inner tubes said inner tube of a specific predetermined length and diameter, said tube having a first and a second end and being hollow and unobstructed from end to end for transport of air/fuel mixture from said carburetor to said intake manifold on said internal combustion engine, said first end of said inner tube attached to said intake bracket such that an opening of said inner tube on said first end corresponds to said opening on said intake bracket;

an output bracket having center opening corresponding to an opening on said second end of said inner tube, said output bracket attached to said second end of said inner tube, said output bracket attachable to said intake manifold on said engine to provide a complete path from said carburetor to an intake on said intake manifold;

an outer tube having a first and a second end, installed over and surrounding said inner tube, said first end being closed around said inner tube near said output bracket and said second end being closed around said inner tube defining a space between an outer surface of said inner tube and an inner surface of said outer tube;

an input port near said output bracket on said outer tube for receiving exhaust from said internal combustion engine into said space between said inner tube and said outer tube;

a means of directing exhaust output of said engine to said input port;

an output port on said outer tube near said intake bracket for said exhaust to exit said space between said inner tube and said outer tube, said exhaust from said engine heating said inner tube by traveling from said input port to said output port through said space to cause air/fuel mixture from said carburetor to be heated, dried and vaporized as it passes through said inner tube; and a means of directing said exhaust from said output port to an exhaust system.

2. The ram tube as set forth in claim 1 in which said ram tube further comprises a device to increase volume efficiency mounted between said base of said carburetor and said intake bracket of said ram tube, said device selected from the group consisting of turbo charger, blower and super charger.

3. The ram tube as set forth in claim 1 in which said ram tube further comprises a water injector, said water injector injecting water into said inner tube after said inner tube has been heated to operating temperatures such that said water is vaporized within said inner tube, and said water being separated into elemental hydrogen and oxygen and burned within a combustion chamber of said internal combustion engine in a short duration to provide an incremental boost to engine output and increased efficiency.

4. The ram tube as set forth in claim 1 in which said ram tube further comprises a water injector, said water injector injecting water into said fuel system at a point prior to an intake in said carburetor after said inner tube has been heated to operating temperatures, such that said water is vaporized within said inner tube, and said water being separated into elemental hydrogen and oxygen and burned within a combustion chamber of said internal combustion engine in a short duration to provide an incremental boost to engine output and increased efficiency.

5. The ram tube as set forth in claim 1 in which said outer tube further includes an outer layer of insulation to retain heat from said exhaust.

6. The ram tube as set forth in claim 1 in which said outer tube is closed about said inner tube at a point below said intake bracket leaving a sufficient length of said inner tube exposed to prevent carburetor overheating.

7. A ram tube for installation between the base of a carburetor and intake manifold on an internal combustion engine comprising:

an intake bracket, having a center opening corresponding to an opening on said base of said carburetor, said intake bracket being attachable to said base of said carburetor;

at least one inner tube of a specific predetermined length and diameter, said tube having a first end and a second end and being hollow and unobstructed from end to end for transport of air/fuel mixture from said carburetor to said intake manifold on said internal combustion engine, said first end of said inner tube attached to said intake bracket such that an opening of said inner tube on said first end corresponds to said opening on said intake bracket;

an output bracket having a center opening corresponding to an opening on said second end of said inner tube, said output bracket attached to said second end of said inner tube, said output bracket attachable to said intake manifold on said engine to provide a complete path from said carburetor to an intake on said intake manifold;

an outer tube having a first and a second end, installed over and surrounding said inner tube, said first end being closed around said inner tube near said output bracket and said second end being closed around said inner tube defining a space between an outer surface of said inner tube and an inner surface of said outer tube;

an input port near said output bracket on said outer tube for receiving exhaust from said internal combustion engine into said space between said inner tube and said outer tube;

a means of directing exhaust output of said engine to said input port;

an output port on said outer tube near said intake bracket for said exhaust to exit said space between said inner tube and said outer tube, said exhaust from said engine heating said inner tube by traveling from said input port to said output port through said space to cause air/fuel mixture from said carburetor to be heated, dried and vaporized as it passes through said inner tube;

a means of directing said exhaust from said output port to an exhaust system: and a heat exchanger attached between said base of said carburetor and said intake bracket.

8. The ram tube as set forth in claim 7 in which said ram tube further includes a device to increase volume efficiency installed between said heat exchanger and said intake bracket on said ram tube, said device selected from the group consisting of turbo charger, blower and super charger.

9. A ram tube for installation between the base of a carburetor and intake manifold on an internal combustion engine comprising:

an intake bracket, having a center opening corresponding to an opening on said base of said carburetor, said intake bracket being attachable to said base of said carburetor;

at least one inner tube of a specific predetermined length and diameter, said tube having a first end and a second end and being hollow and unobstructed from end to end for transport of air/fuel mixture from said carburetor to said intake manifold on said internal combustion engine, said first end of said inner tube attached to said intake bracket such that an opening of said inner tube on said first end corresponds to said opening on said intake bracket;

an output bracket having a center opening corresponding to an opening on said second end of said inner tube, said output bracket attached to said second end of said inner tube, said output bracket attachable to said intake manifold on said engine to provide a complete path from said carburetor to an intake on said intake manifold;

an outer tube having a first and a second end, installed over and surrounding said inner tube, said first end being closed around said inner tube near said output bracket and said second end being closed around said inner tube defining a space between an outer surface of said inner tube and an inner surface of said outer tube;

an input port near said output bracket on said outer tube for receiving exhaust from said internal combustion engine into said space between said inner tube and said outer tube;

a means of directing exhaust output of said engine to said input port;

an output port on said outer tube near said intake bracket for said exhaust to exit said space between said inner tube and said outer tube, said exhaust from said engine heating said inner tube by traveling from said input port to said output port through said space to cause air/fuel mixture from said carburetor to be heated, dried and vaporized as it passes through said inner tube;

a means of directing said exhaust from said output port to an exhaust system; and a heat exchanger attached between said base of said carburetor and said intake bracket, said heat exchanger comprising:

a first bracket attachable to said carburetor having an opening corresponding to an opening on said base of said carburetor;

a first tube, said first tube having a diameter corresponding to said opening in said base of said carburetor, a first end of said first tube attached to said first bracket;

a second bracket attachable to said intake bracket, attached to a second end of said first tube, said second bracket having an opening corresponding to an opening of said second end of said first tube;

a second tube installed over and surrounding said first tube, ends of said second tube sealed to outer surfaces of said first tube to define a passage for heated engine coolant between said first and second tubes;

an input on said second tube into said passage for receiving engine coolant, said engine coolant heating said first tube within said second tube; and an output on said second tube for coolant to exit said passage.

10. A ram tube for installation between the base of a carburetor and intake manifold on an internal combustion engine comprising:

an intake bracket, having a center opening corresponding to an opening on said base of said carburetor, said intake bracket being attachable to said base of said carburetor;

at least one inner tube of a specific predetermined length and diameter, said tube having a first end and a second end and being hollow and unobstructed from end to end for transport of air/fuel mixture from said carburetor to said intake manifold on said internal combustion engine, said first end of said inner tube attached to said intake bracket such that an opening of said inner tube on said first end corresponds to said opening on said intake bracket;

a water injector mounted on said inner tube to spray water at a predetermined rate into the passage of said air/fuel mixture passing through said inner tube, after said inner tube is heated to operating temperatures such that said water is vaporized within said inner tube, and said water being separated into elemental hydrogen and oxygen and burned within a combustion chamber of said internal combustion engine in a short duration to provide an incremental boost to engine output and increased efficiency;

an output bracket having a center opening corresponding to an opening on said second end of said inner tube, said output bracket attached to said second end of said inner tube, said output bracket attachable to said intake manifold on said engine to provide a complete path from said carburetor to an intake on said intake manifold;

an outer tube having a first and a second end, installed over and surrounding said inner tube, said first end being closed around said inner tube near said output bracket and said second end being closed around said inner tube at a point below said intake bracket leaving a sufficient length of said inner tube exposed to prevent carburetor overheating, to define a space between an outer surface of said inner tube and an inner surface of said outer tube;

an input port near said output bracket on said outer tube for receiving exhaust from said internal combustion engine into said space between said inner tube and said outer tube;

a means of directing exhaust output of said engine to said input port;

an output port on said outer tube near said intake bracket for said exhaust to exit said space between said inner tube and said outer tube, said exhaust from said engine heating said inner tube by traveling from said input port to said output port through said space to cause air/fuel mixture from said carburetor to be heated, dried and vaporized as it passes through said inner tube; and a means of directing said exhaust from said output port to an exhaust system.

11. The ram tube as set forth in claim 10 in which said ram tube further comprises a heat exchanger attached between said base of said carburetor and said intake bracket.

12. The ram tube as set forth in claim 10 in which said ram tube further comprises a device to increase volume efficiency mounted between said base of said carburetor and said intake bracket of said ram tube, said device selected from the group consisting of turbo charger, blower and super charger.

13. The ram tube as set forth in claim 11 in which said ram tube further includes a device to increase volume efficiency between said heat exchanger and said intake bracket on said ram tube, said device selected from the group consisting of turbo charger, blower and super charger.

14. The ram tube as set forth in claim 10 in which said outer tube further includes an outer layer of insulation to retain heat from said exhaust.

15. A method of vaporizing fuel, increasing the rate of burn of said fuel within a combustion chamber and increasing percentage of fuel burned in an internal combustion engine, which also allows the use of water as a fuel supplement in which the steps comprise:

installing at least one hollow and unobstructed inner tube of a specific predetermined length and diameter to a base of a carburetor on said internal combustion engine with an intake bracket;

attaching said inner tube to an intake of an intake manifold on said internal combustion engine to provide a complete closed path from said carburetor to said intake manifold;

installing an outer tube over and surrounding said inner tube to create a passage between said inner and outer tubes;

closing a first end of said outer tube around said inner tube at a point near said where said inner tube attaches to said intake manifold;

closing a second end of said outer tube around said inner tube at a point below said intake bracket;

directing exhaust from said internal combustion engine through an input port on said outer tube into said passage between said inner and outer tube;

heating said inner tube with said exhaust entering said passage;

exiting said exhaust from said passage though an output port on said outer tube;

heating an air/fuel mixture passing through said inner tube to create and air/fuel mixture in a dry vapor condition prior to introduction to said intake manifold; and injecting water into said air/fuel mixture after said inner tube has reached operating temperature, as said air/fuel mixture passes through said inner tube said water being vaporized within said inner tube and said water being separated into elemental hydrogen and oxygen and burned within a combustion chamber of said internal combustion engine in a short duration to provide an incremental boost to engine output and increased efficiency.

16. The method of vaporizing fuel, increasing the rate of burn of said fuel within a combustion chamber and increasing percentage of fuel burned in an internal combustion engine, which also allows the use of water as a fuel supplement, as set forth in claim 15 further comprising the step:

attaching a heat exchanger between said base of said carburetor and said inner tube to initially vaporize fuel in said air/fuel mixture.

17. The method of vaporizing fuel, increasing the rate of burn of said fuel within a combustion chamber and increasing percentage of fuel burned in an internal combustion engine, which also allows the use of water as a fuel supplement, as set forth in claim 15 further comprising the step:

installing a device to increase volume efficiency between said base of said carburetor and said inner tube to pressurize said air/fuel mixture, said device selected from the group consisting of turbo charger, blower and super charger.

18. A ram tube for installation between the base of a carburetor and intake manifold on an internal combustion engine, as for use within a vehicle, and designed to provide for enhanced fuel combustion for increased efficiency in operations of said vehicle during usage comprising:

an intake bracket, having a center opening corresponding to an opening on said base of said carburetor, said intake bracket being attachable to said base of said carburetor;

at least one inner tube of a specific predetermined length and diameter, said tube having a first end and a second end and being hollow and having an inner surface being substantially unobstructed from end to end for transport of air/fuel mixture from said carburetor to said intake manifold on said internal combustion engine, said first end of said inner tube attached to said intake bracket such that an opening of said inner tube on said first end corresponds to said opening on said intake bracket;

an output bracket having a center opening corresponding to an opening on said second end of said inner tube, said output bracket attached to said second end of said inner tube, said output bracket attachable to said intake manifold on said engine to provide a complete path from said carburetor to an intake on said intake manifold;

an outer tube having a first and a second end, installed over and surrounding said inner tube, said first end being closed around said inner tube near said output bracket and said second end being closed around said inner tube defining a space between an outer surface of said inner tube and an inner surface of said outer tube;

an input port near said output bracket on said outer tube for receiving exhaust from said internal combustion engine into said space between said inner tube and said outer tube;

means for directing exhaust output of said engine to said input port;

an output port on said outer tube near said intake bracket for said exhaust to exit said space between said inner tube and said outer tube, said exhaust from said engine heating said inner tube by traveling from said input port to said output port through said space to cause air/fuel mixture from said carburetor to be heated, dried and vaporized as it passes through said inner tube;

means for directing said exhaust from said output port to an exhaust system of said vehicle;

there being a plurality of fins integrally attached to the inner surface of said inner tube for increasing the surface area within said inner tube for enhanced heat exchanging without substantially obstructing the flow of the air/fuel mixture therethrough, said fins extending substantially from end to end of said inner tube, and having a streamlined configuration for allowing the air/fuel mixture to pass thereover, for enhanced vaporization due to the enhanced heat exchange efficiency from said heated exhaust gases convectively through said inner tube, and to its plurality of fins, for increasing the vaporization of said mixture, with little obstruction to the flow of said air/fuel mixture therethrough.

* * * * *